(12) United States Patent
Schoen

(10) Patent No.: US 7,654,505 B2
(45) Date of Patent: Feb. 2, 2010

(54) VACUUM VALVE

(75) Inventor: Mathias Schoen, St. Anton am Arlberg (AT)

(73) Assignee: VAT Holding AG,, Haag (CH)

( * ) Notice: Subject to any disclaimer, the term of this patent is extended or adjusted under 35 U.S.C. 154(b) by 448 days.

(21) Appl. No.: 11/758,194

(22) Filed: Jun. 5, 2007

(65) Prior Publication Data

US 2007/0290157 A1 Dec. 20, 2007

(30) Foreign Application Priority Data

Jun. 16, 2006 (AT) .............................. A 1022/2006

(51) Int. Cl.
  *F16K 25/00* (2006.01)
(52) U.S. Cl. ..................... 251/200; 251/199; 251/193; 251/175
(58) Field of Classification Search ................. 251/175, 251/193, 195, 197, 199, 200, 326
See application file for complete search history.

(56) References Cited

U.S. PATENT DOCUMENTS

| | | | | |
|---|---|---|---|---|
| 2,819,034 | A | * | 1/1958 | Holderer ....................... 251/29 |
| 5,087,017 | A | * | 2/1992 | Sawa et al. ................... 251/175 |
| 5,975,492 | A | | 11/1999 | Brenes |
| 6,561,484 | B2 | | 5/2003 | Nakagawa et al. |
| 6,776,394 | B2 | | 8/2004 | Lucas |
| 6,854,708 | B2 | | 2/2005 | Contin et al. |
| 7,413,162 | B2 | * | 8/2008 | Geiser ........................ 251/175 |
| 2004/0079915 | A1 | | 4/2004 | Contin et al. |

FOREIGN PATENT DOCUMENTS

| | | |
|---|---|---|
| CH | 632 820 | 10/1982 |
| DE | 29 04 248 | 8/1980 |
| DE | 198 57 201 | 6/2000 |

* cited by examiner

*Primary Examiner*—John K Fristoe, Jr.
(74) *Attorney, Agent, or Firm*—Reed Smith LLP

(57) ABSTRACT

A vacuum valve comprises a valve housing which has an inlet opening and an outlet opening penetrating opposite walls of the valve housing, a valve seat surrounding the inlet opening, and a closure unit which is arranged in an interior space of the valve housing and which has a valve plate which is adjustable between an open position in which it releases the inlet opening, an intermediate position in which it covers the inlet opening but is lifted from the valve seat, and a closed position in which it covers the inlet opening and is pressed against the valve seat, and at least one adjusting piston which is arranged in an interior space of the closure unit and, for the purpose of adjusting the valve plate between its intermediate position and its closed position, is displaceable in direction of its longitudinal center axis between a passive position in which the valve plate is in its intermediate position and an active position in which the valve plate is in its closed position. At least one work space of the closure unit that can be acted upon by pressure gas for displacing the at least one adjusting piston into its active position is bounded by a diaphragm seal. At least one tappet is arranged at the adjusting piston and is guided out of the interior space of the closure unit through an opening and is supported directly or indirectly at the valve housing when the adjusting piston is displaced from its passive position into its active position.

16 Claims, 10 Drawing Sheets

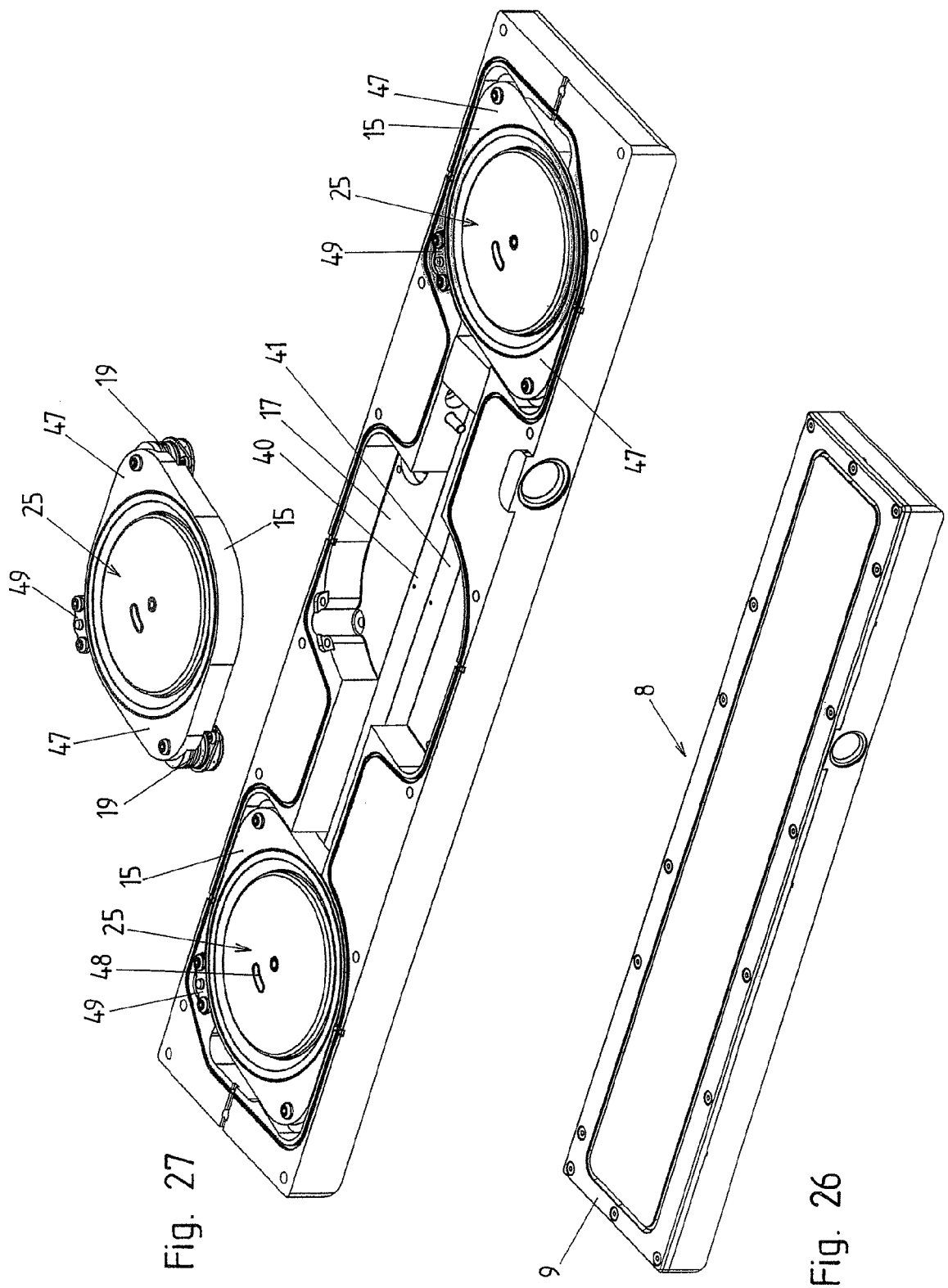

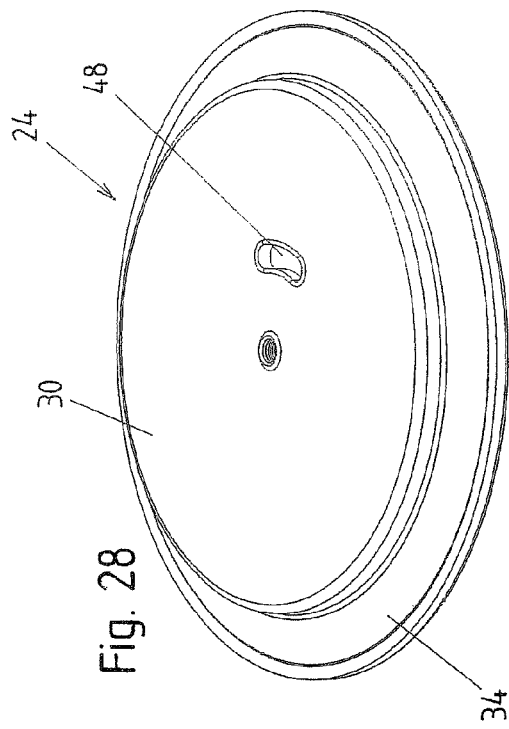
Fig. 28
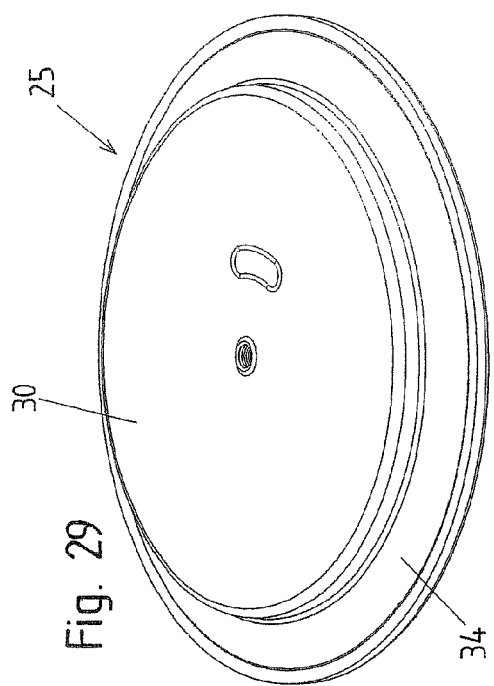
Fig. 29
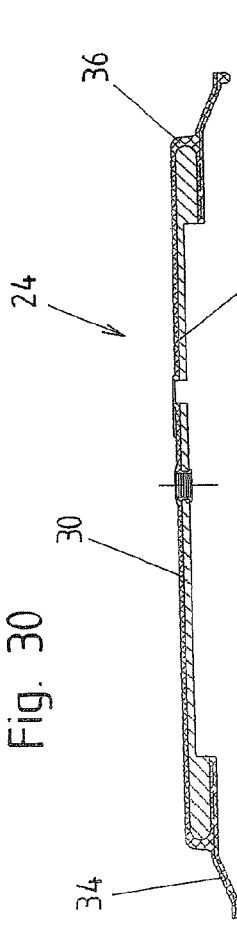
Fig. 30
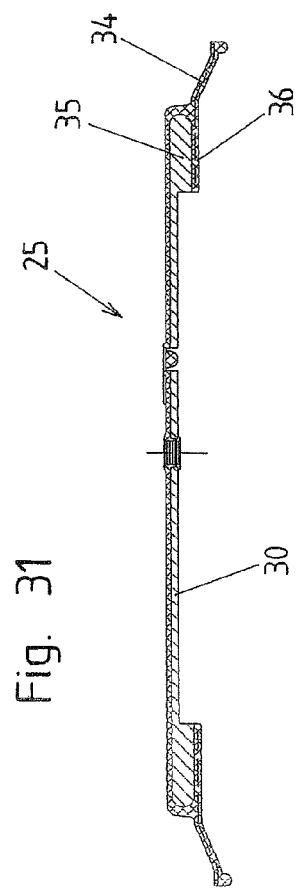
Fig. 31
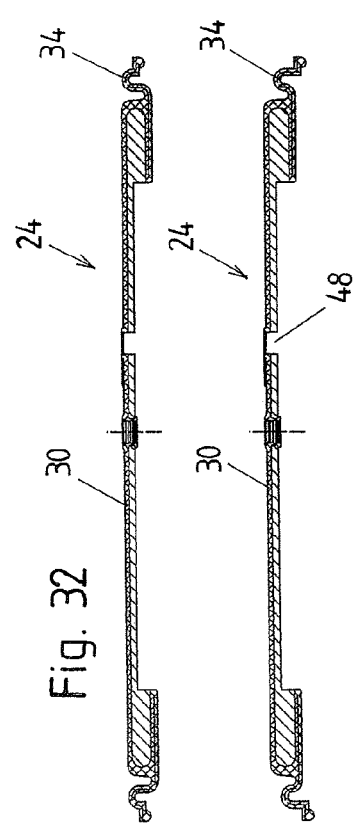
Fig. 32
Fig. 33

VACUUM VALVE

CROSS-REFERENCE TO RELATED APPLICATION

This application claims priority of Austrian Application No. A 1022/2006, filed Jun. 16, 2006, the complete disclosure of which is hereby incorporated by reference.

BACKGROUND OF THE INVENTION a) Field of the Invention

The invention is directed to a vacuum valve comprising a valve housing which has an inlet opening and an outlet opening which penetrate opposite walls of the valve housing, a valve seat surrounding the inlet opening, and a closure unit which is arranged in an interior space of the valve housing and which has a valve plate which is adjustable between an open position in which it releases the inlet opening, an intermediate position in which it covers the inlet opening but is lifted from the valve seat, and a closed position in which it covers the inlet opening and is pressed against the valve seat, and at least one adjusting piston which is arranged in an interior space of the closure unit and, for the purpose of adjusting the valve plate between its intermediate position and its closed position, is displaceable in direction of its longitudinal center axis between a passive position in which the valve plate is in its intermediate position and an active position in which the valve plate is in its closed position. At least one work space of the closure unit that can be acted upon by pressure gas for displacing at least one adjusting piston into its active position is bounded by a diaphragm seal.

b) Description of the Related Art

A vacuum valve in which a valve plate is displaceable between its intermediate position and its closed position by means of an adjusting piston arranged in an interior space of a closure unit is known from U.S. Pat. No. 6,561,484 B2. The closure unit comprises the valve plate and a supporting plate. The valve plate and the supporting plate can be anchored against the valve housing between the inner surfaces of the valve housing in the area around the inlet opening and the outlet opening by means of the adjusting piston. A receiving housing for the adjusting piston can be arranged at the supporting plate or at the valve plate. Sealing rings acting between the adjusting piston and the receiving housing are provided for forming work spaces which are acted upon by pressure to displace the adjusting piston. At least one sealing bellows extends between the valve plate and the supporting plate in some of the embodiment forms. In addition to embodiment forms in which the closure unit is displaceable linearly for adjusting between its open position and its intermediate position, embodiment forms constructed in the manner of a pendulum valve are also described. In these embodiment forms, the carrying arm at which the closure unit is arranged is swivelable around a swiveling axis for displacing the closure unit between its open position and its intermediate position.

Another valve in which a valve plate is displaceable between its intermediate position and its closed position by means of a adjusting piston arranged in an interior space of a closure unit is known from US 2004/0079915 A1. In this case also, work spaces which can be acted upon by pressure gas for displacing the adjusting piston are sealed by flexible sealing rings.

U.S. Pat. No. 6,776,394 B2 discloses a pendulum valve in which cylinder bore holes in which adjusting pistons are arranged are formed in the valve housing. Tappets can be displaced by the adjusting pistons in order to press the valve plate against the valve seat in the closed position of the valve plate. The adjusting pistons are likewise sealed relative to the walls of the cylinder spaces by sealing rings.

A vacuum valve of the type mentioned above is known from the embodiment example shown in FIG. 5 of DE 19 857 201 A1. Tensioning cylinders serve as lifting bodies for pressing valve plates against a valve housing. The tensioning cylinders are sealed relative to a base body of the closure unit by diaphragm seals.

It is known from U.S. Pat. No. 5,975,492 A to press valve plates against valve seats of the valve housing by means of an actuator arranged in an interior space of the closure unit. The actuator comprises plates which are pressed together so as to be tight against pressure by high-grade steel bellows (see FIG. 21).

Further, adjusting elements with diaphragm pistons are known from other applications as vacuum valves, for example, in automobile engineering in connection with brake cylinders or in fixture construction for clamping parts, i.e., workpieces to be clamped.

OBJECT AND SUMMARY OF THE INVENTION

It is the primary object of the invention to provide an advantageous, compact vacuum valve of the type mentioned above in which the sealed state can be maintained over a long period of time in the event of loss of pressure gas.

According to the invention, this object is met by a vacuum valve comprising a valve housing which has an inlet opening and an outlet opening which penetrate opposite walls of the valve housing, a valve seat surrounding the inlet opening, and a closure unit which is arranged in an interior space of the valve housing and which has a valve plate which is adjustable between an open position in which it releases the inlet opening, an intermediate position in which it covers the inlet opening but is lifted from the valve seat, and a closed position in which it covers the inlet opening and is pressed against the valve seat, and at least one adjusting piston which is arranged in an interior space of the closure unit and, for the purpose of adjusting the valve plate between its intermediate position and its closed position, is displaceable in direction of its longitudinal center axis between a passive position in which the valve plate is in its intermediate position and an active position in which the valve plate is in its closed position, wherein at least one work space of the closure unit that can be acted upon by pressure gas for displacing at least one adjusting piston into its active position is bounded by a diaphragm seal, and wherein at least one tappet is arranged at the adjusting piston on the side facing the outlet opening, this at least one tappet being guided out of the interior space of the closure unit through an opening and being supported directly or indirectly at the valve housing in the area next to the outlet opening for pressing the valve plate against the valve seat when the adjusting piston is displaced from its passive position into its active position.

Because the work space serving for the displacement of the adjusting piston into its active position is sealed by a diaphragm seal, a high degree of tightness of this work space can be achieved. Accordingly, the sealed state of the vacuum valve is maintained for a long period of time in the event of an outage of the pressure gas in the closed position of the valve plate.

Further, by means of the construction according to the invention, the vacuum valve can be constructed in a compact manner with respect to the dimensioning of the valve housing between the inlet opening and outlet opening.

In an advantageous embodiment form of the invention, the diaphragm seal is disk-shaped and is tightly connected in the area of its circumferential edge to the adjusting piston and, in a middle portion, is held in contact with the inner surface of a wall of the receiving housing for the adjusting piston. It is also conceivable and possible for the disk-shaped diaphragm to be connected in the area of its circumferential edge in a vacuum-tight manner to the wall and held so that its middle portion contacts the adjusting piston. Further, the diaphragm could also be annular and connected at its outer circumferential edge in a vacuum-tight manner to the adjusting piston or to the wall and at its inner circumferential wall to the other of these two parts.

At least one portion of the diaphragm, preferably an annular portion adjoining its outer circumferential edge, is made of a flexible plastics material.

A vacuum valve according to the invention can be constructed economically due to its small quantity of parts. Further, maintenance periods can be spread out over a longer time due to low wear.

In an advantageous manner, a work space which is acted upon by pressure gas can be sealed relative to a remaining area of the interior space of the closure unit by the diaphragm seal, and this remaining area of the interior space of the closure unit can be sealed relative to the vacuum area of the vacuum valve. Accordingly, this remaining area of the interior space of the closure unit can be connected to the atmosphere or evacuated. This remaining area of the interior space of the closure unit accordingly forms a safety space between the work space that is sealed by the diaphragm seal and the vacuum area of the vacuum valve to prevent pressure gas from flowing out into the vacuum area of the vacuum valve in case of a leak in the work space that is acted upon by pressure gas.

Further advantages and details of the invention are described in the following with reference to the accompanying drawings.

BRIEF DESCRIPTION OF THE DRAWINGS

In the drawings:

FIG. 26 shows an oblique view of the closure unit according to this embodiment form of the invention (without seal);

FIG. 27 shows the closure unit from FIG. 26 with the valve plate removed, wherein one of the adjusting pistons is shown pulled out of the receiving housing;

FIGS. 28 and 29 show oblique views of the diaphragm seals according to this embodiment example;

FIGS. 30 and 31 show longitudinal center sections through the diaphragm seals of FIGS. 28 and 29; and FIGS. 32 and 33 show another embodiment form of a diaphragm seal designed as a rolling diaphragm in the passive position and in the active position of the adjusting piston.

DESCRIPTION OF THE PREFERRED EMBODIMENT EXAMPLES

Figure 1:
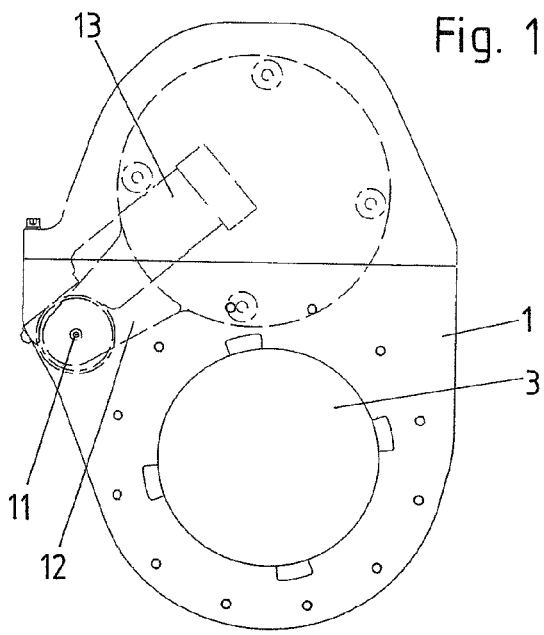
FIG. 1 shows an embodiment form of a vacuum valve according to the invention in the open position of the valve plate.

An embodiment example of a vacuum valve according to the invention is shown in FIGS. 1 to 17. The vacuum valve has a valve housing 1 with an inlet opening 2 and an outlet opening 3 which penetrate opposite walls 4, 5 of the valve housing 1. A valve seat 6 surrounds the inlet opening 2, which is formed by a sealing surface in the present embodiment example, at the inner surface of the wall 4 having the inlet opening 2.

A closure unit 8 comprising a valve plate 9 is arranged in an interior space 7 of the valve housing 1. In the present embodiment example, the valve plate 9 has a flexible sealing ring 10 for contacting the valve seat 16 in the closed state of the vacuum valve. It is also conceivable and possible in principle to arrange the sealing ring at the valve seat 6 and a sealing surface cooperating with the sealing ring at the valve plate 9.

Figure 2:
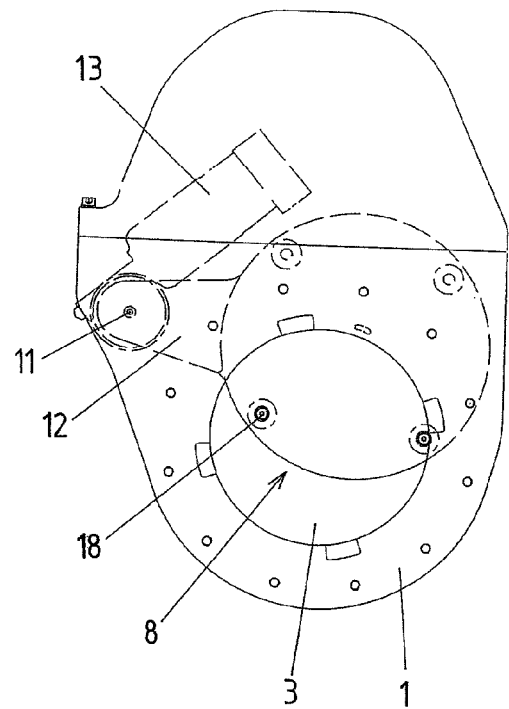
FIG. 2 shows a view corresponding to FIG. 1, wherein the valve plate is in a position in which it partially covers the inlet opening.
Figure 3:
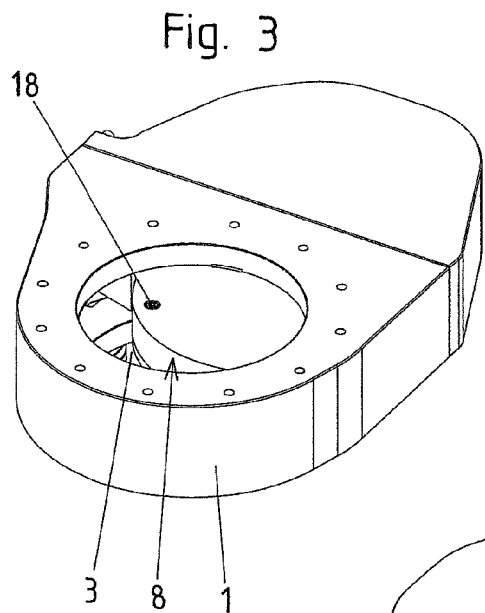
FIG. 3 is an oblique view of the vacuum valve in the position of the valve plate corresponding to FIG. 2.
Figure 4:
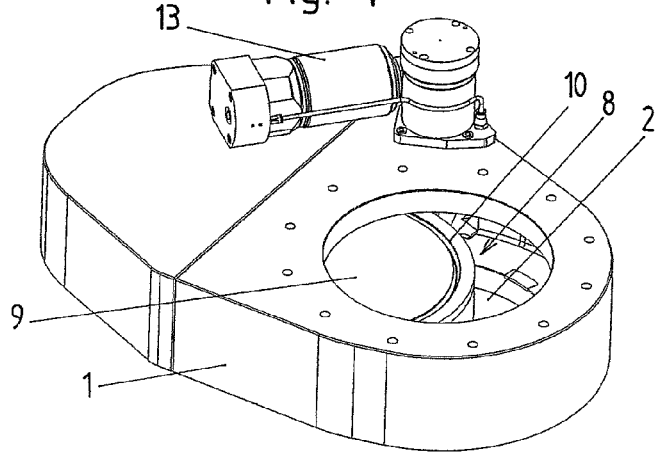
FIG. 4 is an oblique view of the vacuum valve in the position of the valve plate corresponding to FIG. 2 from the opposite side of the valve housing with reference to FIG. 3.
Figure 5:
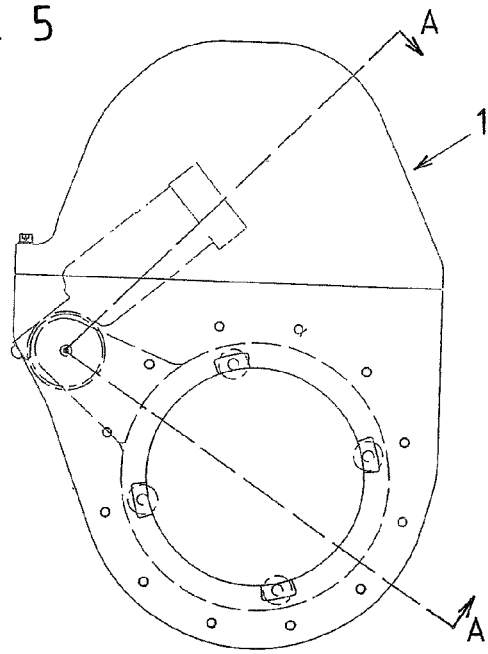
FIG. 5 is a view corresponding to FIG. 1, but in the intermediate position of the valve plate in which it covers the inlet opening.
Figure 8:
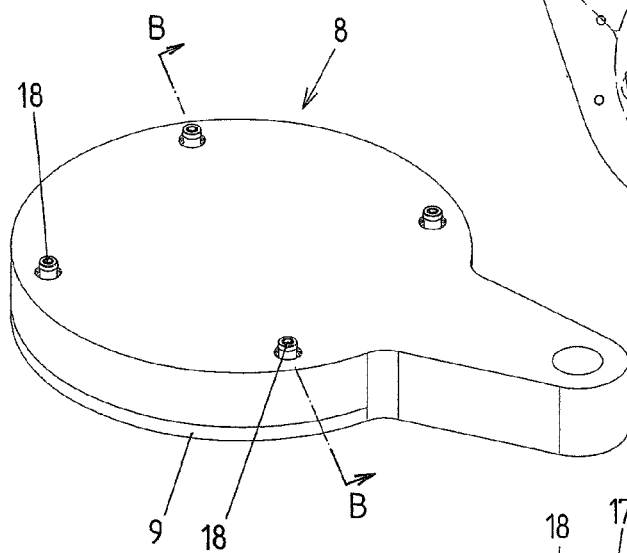
FIG. 8 is an oblique view of the closure unit.
Figure 9:
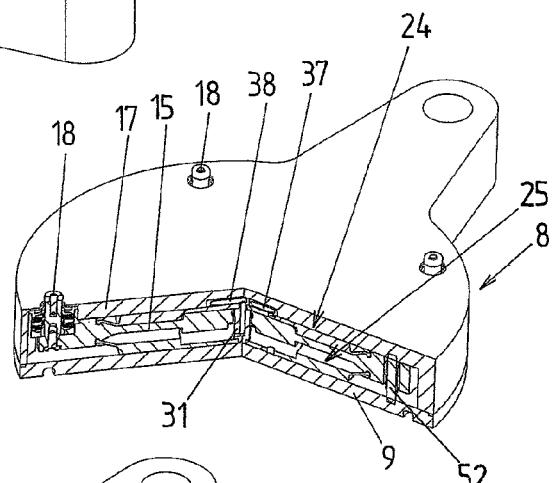
FIG. 9 is an oblique view of the closure unit in section in the active position of the adjusting piston.
Figure 10:
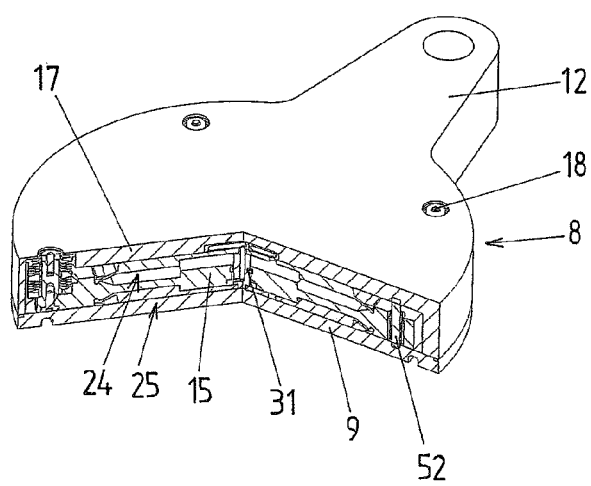
FIG. 10 is a view corresponding to FIG. 9 in the passive position of the adjusting piston.

In this embodiment example, the vacuum valve is designed as a pendulum valve and the closure unit 8 is arranged at an arm 12 which is swivelable around a swiveling axis 11. A rotary drive 13 serves to swivel the arm 12 by means of the shaft 21 at which the arm 12 is arranged. By means of the rotary drive 13, the closure unit 8 and therefore the valve plate 9 can be swiveled between a position (FIG. 1) in which the inlet opening 2 is released and in which the vacuum valve is in its completely open state and a position in which it covers the inlet opening 2 viewed in direction of the longitudinal axis 14 of the inlet opening 2 (see FIG. 5). Since the valve plate 9 is initially lifted from the valve seat 6, this position is referred to within the present framework as the intermediate position. FIGS. 2 to 4 show a middle position between the open position and the intermediate position.

The closure unit 8 further comprises a rigid adjusting piston 5 which is arranged in an interior space 16 of a receiving housing of the closure unit 8. In the present embodiment example, a wall of this receiving housing is formed by the valve plate 9. The valve plate 9 is arranged in another part of the receiving housing, preferably so as to be removable, e.g., by screws, and is accordingly sealed relative to this other part by means of a sealing ring 51 (see, e.g., FIG. 11 and FIG. 12). A wall 17 of the receiving housing located opposite to the valve plate 9 has openings for the passage of tappets 18 which are arranged at the adjusting piston 15 on the side of the adjusting piston 15 remote of the valve plate 9. The passage through which the tappet 18 exits from the interior space 16 is preferably sealed, e.g., by means of bellows 19.

The adjustment of the valve plate 9 between its intermediate position and its closed position, in which it covers the inlet opening 2 viewed in direction of the longitudinal axis 14 of the inlet opening 2 and is pressed against the valve seat 6, is carried out by means of the adjusting piston 15. For this purpose, the adjusting piston 15 is displaced in direction of its longitudinal center axis 20 between a passive position (FIGS. 6, 10, 12) and an active position (FIGS. 7 to 9 and 11). When the adjusting piston 15 is displaced from its passive position to its active position, the tappets 18, which are initially at a distance from the wall 5 of the valve housing 1 having the outlet opening 3, run against the inner surface of this wall 5 and consequently displace the valve plate 9 in direction of the longitudinal axis 14 of the inlet opening 2, or in direction of the longitudinal center axis 20 of the adjusting piston 15, until it is pressed against the valve seat. In so doing, the shaft 21 at which the arm 12 is arranged moves in direction of its longitudinal axis. A displacement of the shaft 21 of this kind is known in pendulum valves. For example, the shaft 21 has in the area of its end remote of the closure unit 8 an external toothing with which a toothed wheel of the rotary drive 13 engages, which external toothing can be displaced relative to the toothed wheel in longitudinal direction of the shaft 21.

The longitudinal axis 14 of the inlet opening 2 preferably extends parallel to the longitudinal axis of the inlet opening 3. These longitudinal axes preferably coincide. In the present embodiment example, the inlet opening 2 and the outlet opening 3 have the same diameter, which is preferable.

The longitudinal axis 14 of the inlet opening 2 and the longitudinal center axis 20 of the adjusting piston 15 are preferably parallel to one another. In the present embodiment example, these axes coincide in the closed position of the valve plate 9.

In the area of their free ends, the tappets 18 preferably have flexible stop elements for running against the wall 5.

Figures 11, 12:
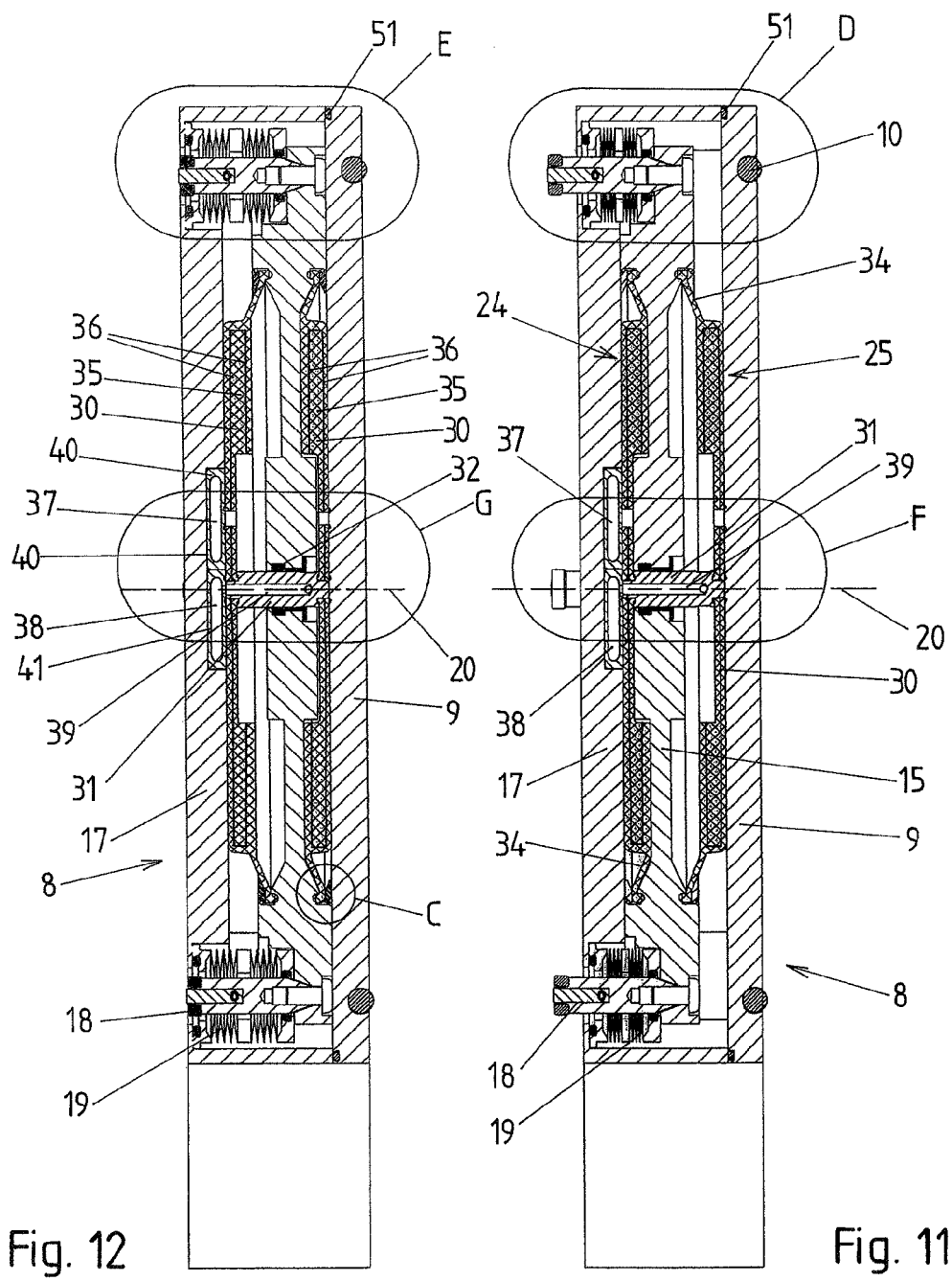
FIG. 11 shows a section along line B-B of FIG. 8 in the active position of the adjusting piston.
FIG. 12 shows a section corresponding to FIG. 11 in the passive position of the adjusting piston.
Figure 13:
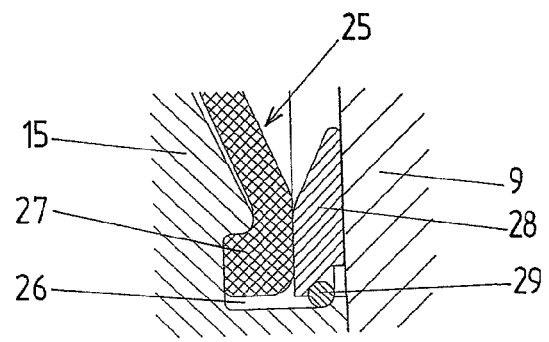
FIG. 13 shows an enlarged detail C from FIG. 12.
Figure 15:
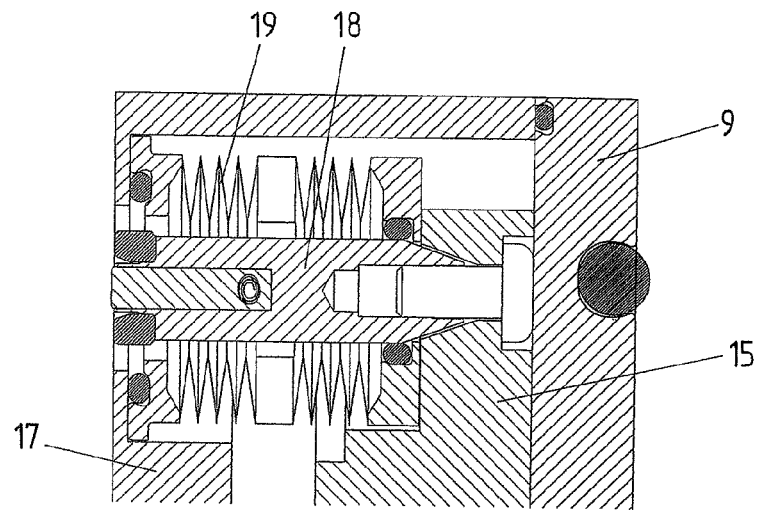
FIGS. 14 and 15 show enlarged sections D and E from FIG. 11 and FIG. 12.
Figure 14:
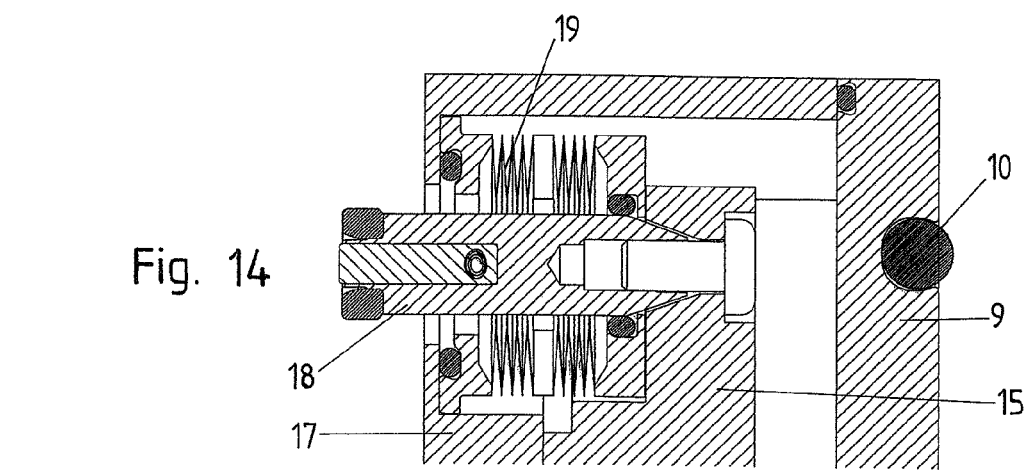
Figure 17:
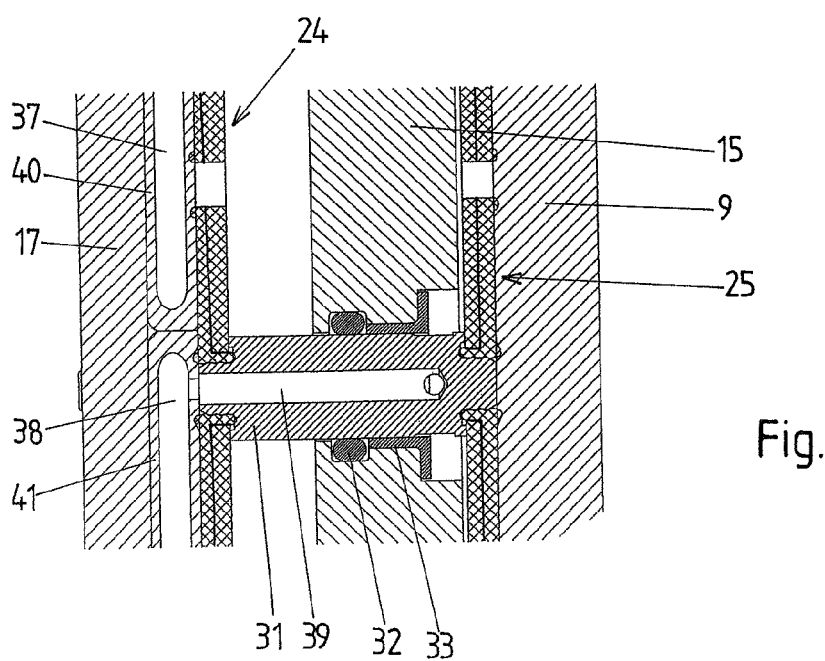
FIG. 16 and FIG. 17 show enlarged sections F and G from FIG. 11 and FIG. 12.
Figure 16:
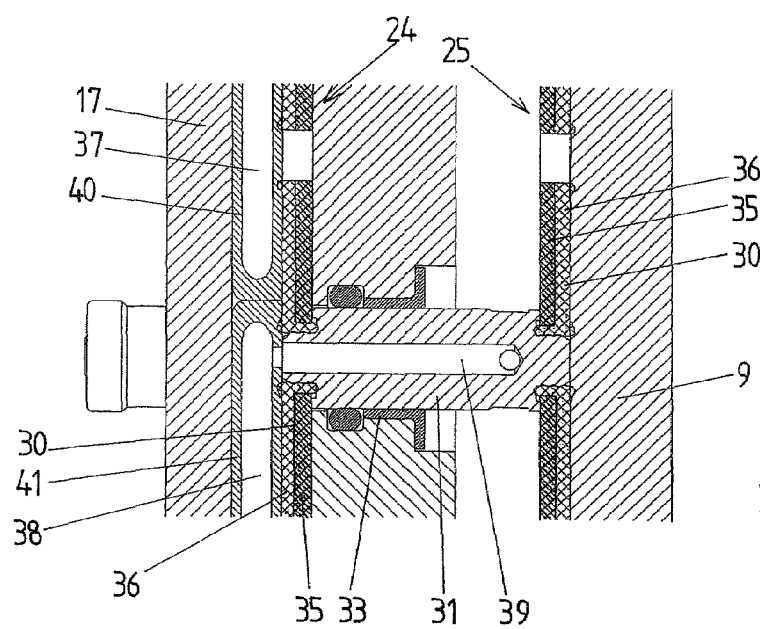

Work spaces 22, 23 are acted upon by pressure gas for displacing the adjusting piston 15 between its passive position and its active position. The work spaces 22, 23 are sealed by means of diaphragm seals 24, 25. The diaphragm seals 24, 25 are plate-shaped in this embodiment example and are tightly connected in the area of their circumferential edge to the respective side surface of the adjusting piston 15. In the simplified views in FIGS. 6 and 7, this connection is not shown in detail. An embodiment example for a connection of this kind is shown in FIGS. 11 to 13. In this embodiment, the adjusting piston 15 has an annular groove 26 in which a projection 27 of the respective diaphragm seal 24, 25 projects. The tight fastening to the adjusting piston 15 is achieved by means of a holding ring 28 and a clamping ring 29 which holds the holding ring in a position in which it is pressed against the diaphragm seal 24, 25 and which is supported at an undercut shoulder of the adjusting piston 15.

In a middle portion 30, the diaphragm seal 24 is held in contact against the inner surface of the wall 17 of the closure unit 8 and the diaphragm seal 25 is held in contact against the inner surface of the valve plate 9.

Figure 7:
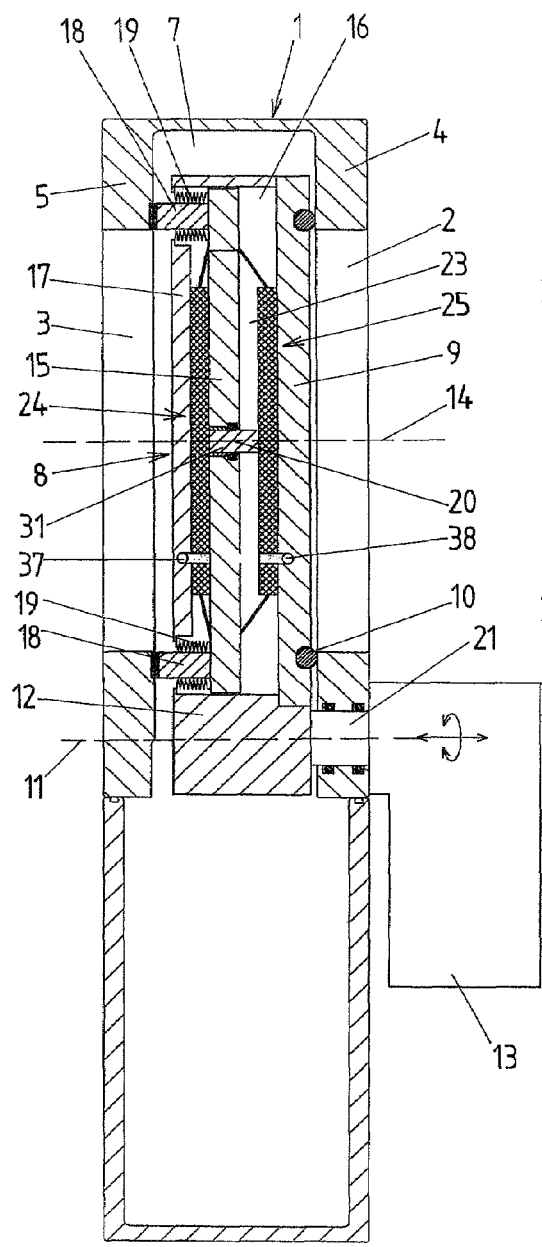
FIG. 7 shows a section corresponding to FIG. 6 in the closed position of the valve plate.
Figure 6:
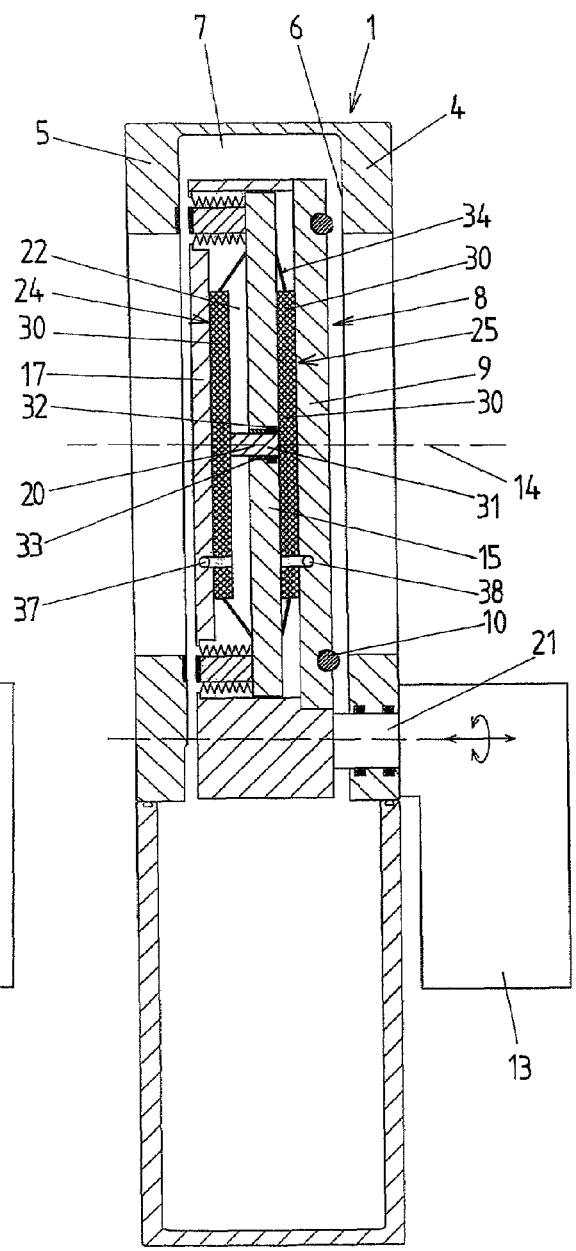
FIG. 6 is a simplified, partially schematic section long line A-A of FIG. 5 in the intermediate position of the valve plate.

In the simplified views shown in FIGS. 6 and 7, these middle portions 30 are shown only by thickened areas. For example, they could be glued to the inner surface of the wall 17 or valve plate 9. However, the diaphragm seal 24, 25 is preferably rigid in this middle portion 30 and a pin 31 serves to hold it in contact with the inner surface of the wall 17 or valve plate 9. This pin 31 is oriented in direction of the longitudinal center axis 20 of the adjusting piston 15 and penetrates a preferably central opening in the adjusting piston 15 relative to which it is sealed, for example, by means of a flexible sealing ring 32. Further, the adjusting piston 15 is preferably provided with a sliding bush 33 surrounding this opening.

To hold the diaphragm seals 24, 25 in contact with the inner surface of the wall 17 or valve plate 9 along their entire middle portion 30 by means of the pin 31, the diaphragm seals 24, 25 are rigidly constructed in this middle potion 30. A flexible, resilient annular portion 34 adjoins the circumferential edge.

It is conceivable and possible to construct the middle portion 30, in its entirety, from a rigid material, for example, metal. A plate-shaped metal part 35 is preferably coated with a flexible plastic or embedded in a flexible plastic in this middle portion 30 as is shown in FIGS. 11, 12 and 16, 17. The flexible plastic is preferably vulcanized on the plate-shaped metal part 35.

The flexible plastic of the diaphragm seals 24, 25 is preferably an elastomer or a thermoplastic elastomer.

The construction corresponds in principle to that described below with reference to another embodiment example shown in FIGS. 28 to 31. In the area of the annular portion 34, the diaphragm seal 24, 25 is made entirely of flexible plastic, preferably the same flexible plastic that is vulcanized on the metal part 35 in the middle portion 30.

Pressure gas channels 37, 38 extending through the receiving housing for the adjusting piston 15 serve for supplying pressure gas to the work spaces 22, 23. In the views according to FIG. 6 and FIG. 7, a pressure gas channel 37 extends through the wall 17 and a pressure gas channel 38 extends through the valve plate 9. The pressure gas channels 37, 38 are continued by holes in the middle portions 30 of the diaphragm seals 24, 25 and open through these into the work spaces 22, 23.

Compressed air or nitrogen under pressure, for example, are preferably used as pressure gas.

However, it is preferable that the two pressure gas channels 37, 38 extend through the wall 17, and the pressure gas channel 38 is continued by a hole through the middle portion 30 of the diaphragm seal 24 and a channel 39 which extends in the pin 31 and which exits at the circumference of the pin 31 in the area of the work space 23 (see FIGS. 11, 12, 16 and 17).

The pressure gas channels 37, 38 preferably extend through flat pipes 40, 41 which are introduced in recesses of the wall 17 and whose interiors communicate with the holes in the diaphragm seal 24 by bore holes through their walls. The holes in the diaphragm seal 24 are preferably sealed relative to the pipes 40, 41 by sealing beads of the diaphragm seal 24 which are pressed against the pipes 40, 41.

For the sake of simplicity, the diaphragm seal 25 can be constructed identical to diaphragm seal 24.

The adjusting piston 15 can also be guided by the pin 31. Additional guides can be provided in the area of the circumference of the adjusting piston 15 if required (see guide pins 52 in FIGS. 9 and 10).

The pressure gas channels 37, 38 are continued by pressure gas channels, not shown in the drawing, in the shaft 21 so that the work spaces 22, 23 can be acted upon by pressure outside the valve housing 1.

For displacing the valve plate 9 from its intermediate position to its closed position, pressure gas channel 38 is acted upon by pressure gas and pressure gas channel 37 is connected to atmospheric pressure so that the work space 23 is charged and the adjusting piston 15 is displaced from its passive position into its active position. To return to the intermediate position, pressure gas channel 37 is acted upon by pressure gas and pressure gas channel 38 is connected to atmospheric pressure so that the work space 22 is charged and the adjusting piston 15 is returned to its passive position.

When the adjusting piston 15 is adjusted from its passive position to its active position, and vice versa, there is an elastic deformation of the diaphragm seals 24, 25 in the area of their annular portions 34. The annular portions 34 preferably enclose an angle between 0° and 45° with the plane of the adjusting piston 15 over the entire adjustment area. On the other hand, there is no deformation of the diaphragm seals 24, 25 in the area of their middle portions 30.

It is also conceivable and possible that the diaphragm seals 24, 25 are fastened in the area of their circumferential edge to the inner surface of the wall 17 or valve plate 9. In the middle portion, they could be fastened to the respective surface of the adjusting piston 15 or pressed against the adjusting piston 15 in that the work space 22, 23 sealed by them is acted upon by pressure.

It is basically conceivable and possible also that the diaphragm seals 24, 25 are constructed annularly, i.e., only the outer portion 34 described above is provided, and fastened to the adjusting piston 15 on one side and to the inner surface of the wall 17 or valve plate 9 on the other side so as to be connected to these parts in a vacuum-tight manner in each instance. They would then be formed of flexible plastic 36 in their entirety and would preferably enclose an angle between 0° and 45° with the principal plane of the adjusting piston 15 over the entire adjustment area of the adjusting piston 15.

Accordingly, in the plate-shaped construction of the diaphragm seals 24, 25 as well as in an annular construction of the diaphragm seals, the work spaces 22, 23 are bounded by the diaphragm seals 24, 25 in radial direction with reference to the longitudinal center axis 20 of the adjusting piston 15.

The work spaces 22, 23 are sealed from the rest of the area of the interior 16 of the closure unit 8 by the diaphragm seals 24, 25. This remaining area of the interior space 16 of the closure unit 8 is preferably sealed from the vacuum area of the valve; for example, bellows 19 are provided for the tappets 18 as was shown and described above. This remaining area of the interior space 16 can preferably be connected to the atmosphere by a conduit that is not shown in the drawings. It is also conceivable and possible to evacuate this remaining area of the interior space. Accordingly, the pressure of the pressure gas acting upon the adjusting piston 15 is separated from the vacuum area by the intermediary of a space which is at atmospheric pressure or is evacuated. This represents an additional safety function of the vacuum valve.

Figure 18:
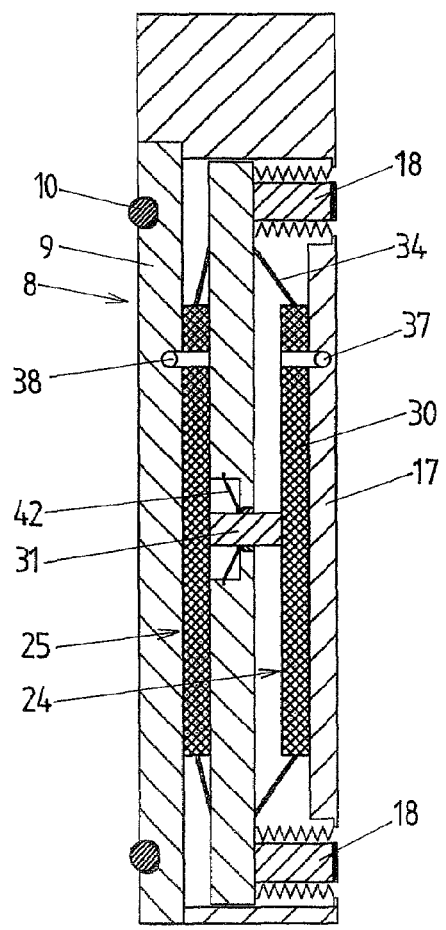
FIG. 18 and FIG. 19 show sections through the closure unit according to another embodiment form of the invention.
Figure 19:
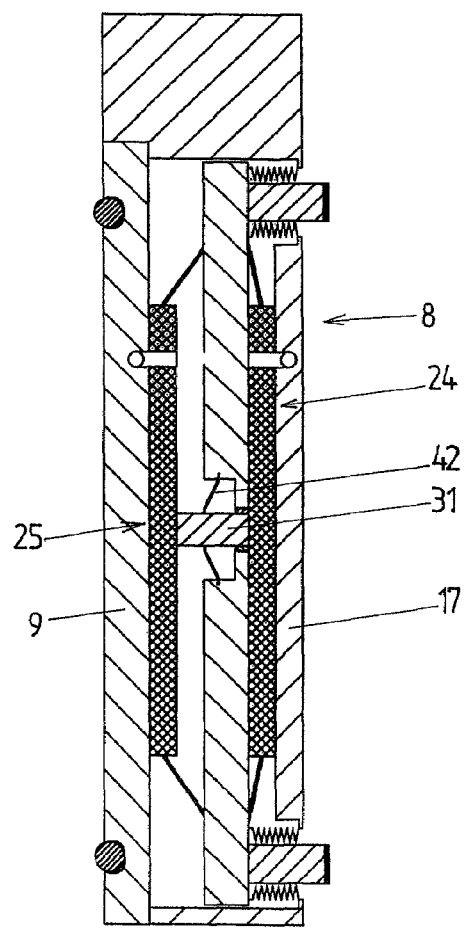

FIGS. 18 and 19 show a simplified view of a somewhat modified embodiment form in which the pin 31 is sealed from the adjusting piston 15 by a diaphragm seal 42. These diaphragm seals are annular and are fastened to the pin 31 on one side and to the adjusting piston 15 on the other side and are sealed relative to these parts. Accordingly, there are no longer any dynamic seals in this construction; rather, all of the seals are formed as static seals.

Figure 20:
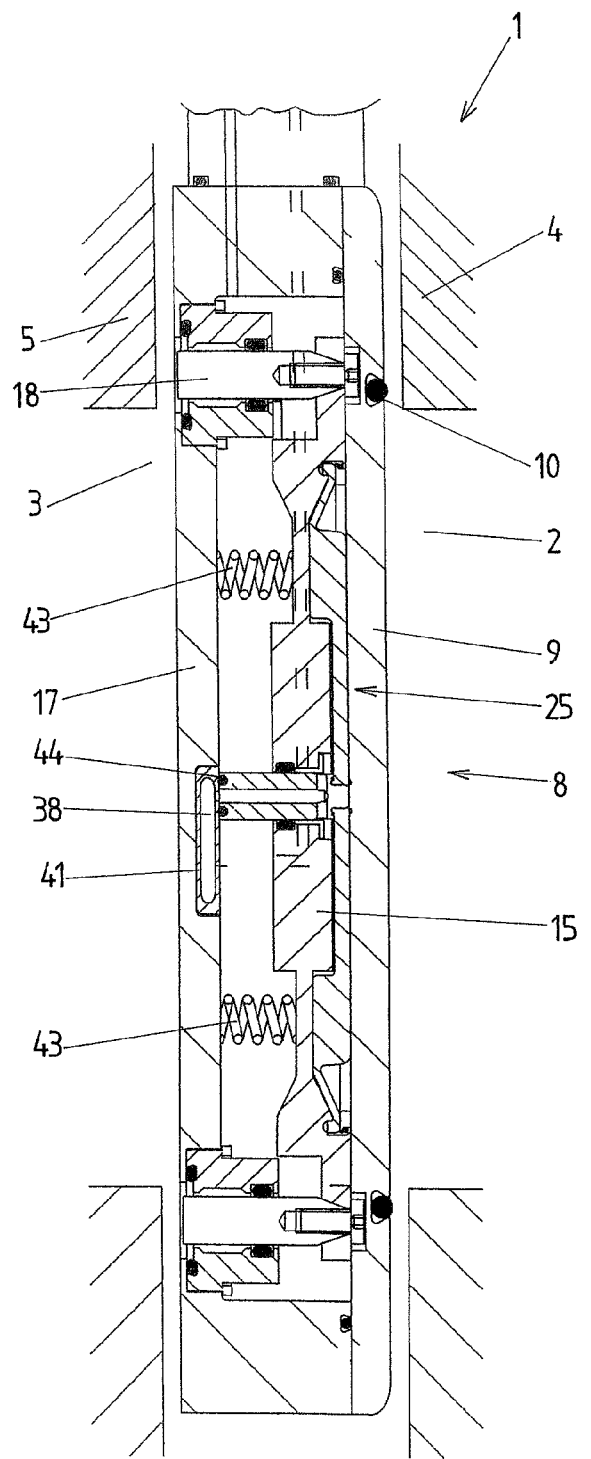
FIG. 20 and FIG. 21 show a third embodiment form of the invention.
Figure 21:
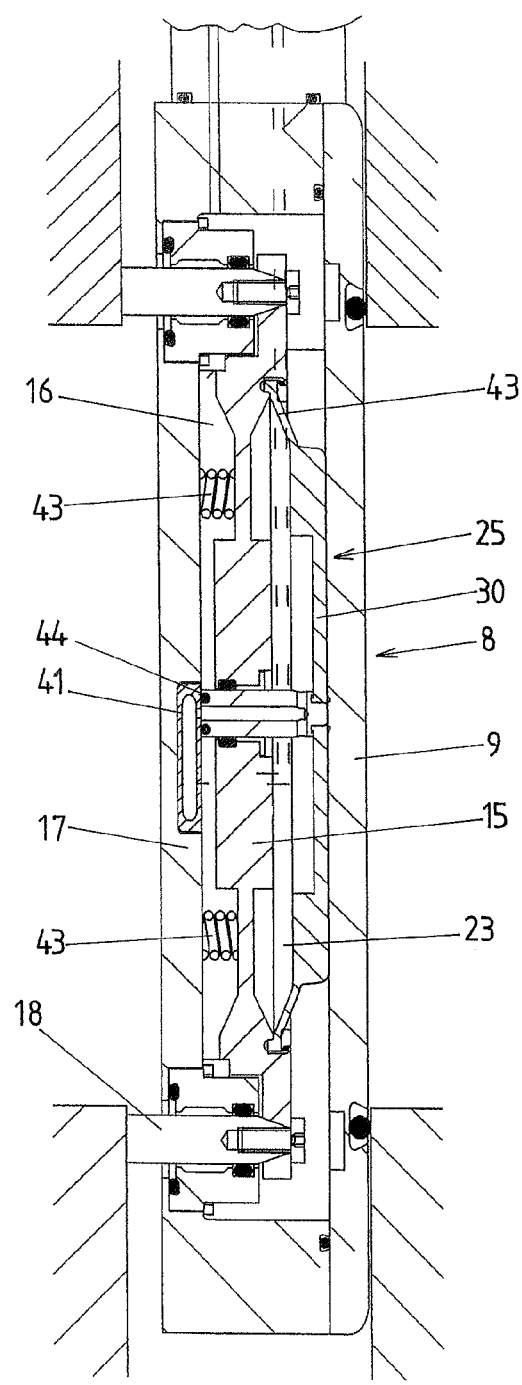

As is shown in FIGS. 20 and 21, springs 43 can also be provided for restoring the adjusting piston 15 to its passive position from its active position. Accordingly, the work space 22 and the diaphragm seal 24 sealing this work space are omitted in this embodiment example. Therefore, a single-action adjusting piston 15 is provided in this embodiment example instead of the dual-action adjusting piston described above. Again, the pressure gas preferably impinges on the work space 23 through which the adjusting piston 15 is displaced into its active position through a bore hole through the pin 31. The pin 31 is supported at its end remote of the work space 23 by a seal 44 at the pipe 41 and, therefore, indirectly at the wall 17.

Also, in this embodiment example the work space 23 is sealed from the rest of the area of the interior space 16 of the closure unit 8 by the diaphragm seal 25. The rest of the area of the interior space 16 is preferably connected to atmospheric pressure or is pumped out (via a channel which is not shown in the drawings).

In the embodiment example shown in FIGS. 22 to 31, the closure unit 8 is displaced linearly (in a straight line) between the open position of the valve plate 9 and the intermediate position of the valve plate 9. For this purpose, for example, it is arranged at a valve rod 45 which is displaceable in its longitudinal direction by means of a linear drive, for example, a piston-cylinder unit 46 which is shown schematically in FIGS. 22 and 24.

The inlet opening 2 and outlet opening 3 in the valve housing 1 and the valve plate 9 have a rectangular shape in this embodiment form. The closure unit 8 comprises, for example, three adjusting pistons 15. More or fewer adjusting pistons 15 can also be provided. Each adjusting piston 15 is constructed as a dual-action piston in a manner analogous to that described above in connection with the embodiment example according to FIGS. 1 to 17, and diaphragm seals 24, 25 serve to seal the work spaces. Again, a respective adjusting piston 15 could be restored to its passive position from its active position through at least one spring and the diaphragm seals 24 could again be dispensed with in this case.

The adjusting pistons 15 have circumferential contours deviating from the circular shape considered in the direction of their longitudinal center axis 20 (FIGS. 22 to 25). They are provided with projecting portions 47 at opposite locations in circumferential direction. A tappet 18 is arranged at the adjusting piston 15 in the area of a respective projecting portion 47. These tappets are again guided out of the receiving housing for the adjusting pistons 15 through bore holes and serve for pressing the valve plate 9 against the valve seat 6 in the active position of the adjusting pistons 15.

Figure 24:
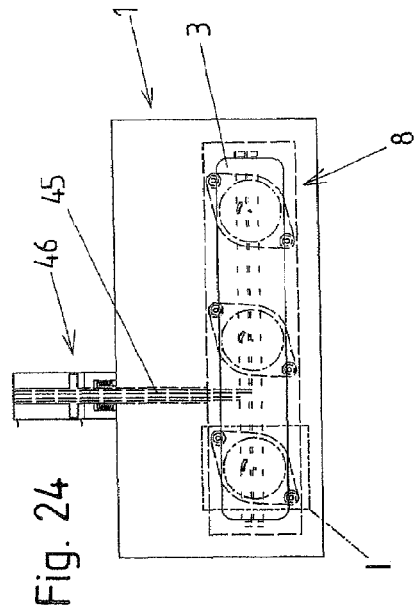
FIG. 24 shows an embodiment form corresponding to FIG. 22, but with a smaller width of the inlet opening and outlet opening of the valve housing.
Figure 25:
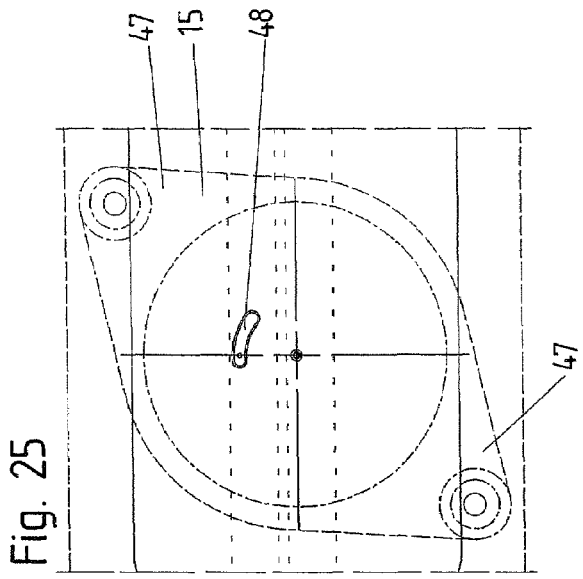
FIG. 25 shows an enlarged detail I from FIG. 24.
Figure 22:
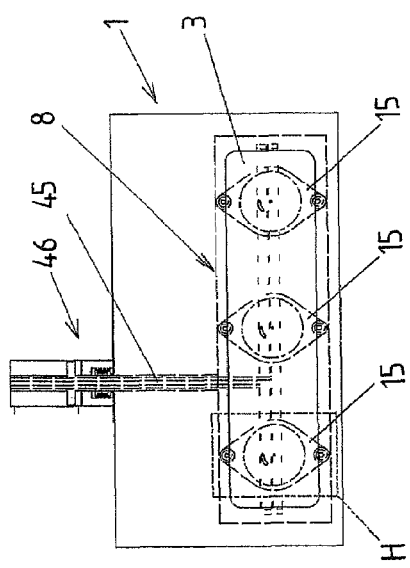
FIG. 22 is a schematic view of a vacuum valve according to a fourth embodiment form of the invention.
Figure 23:
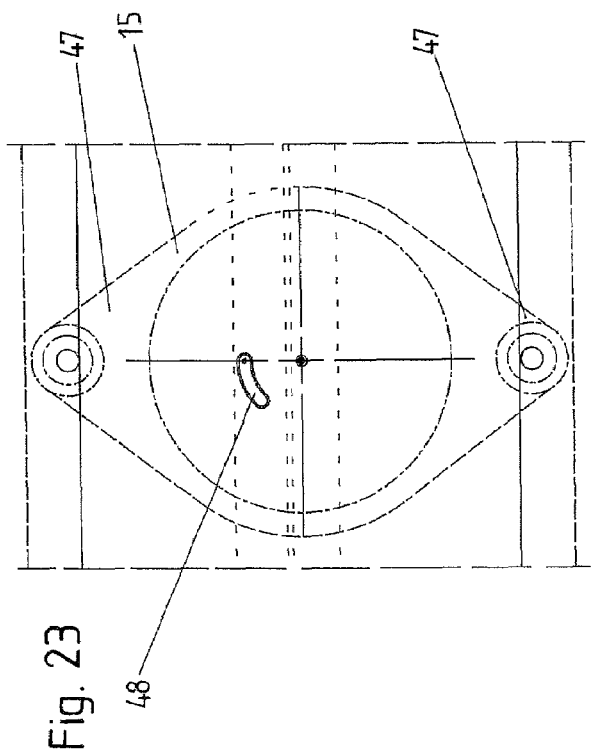
FIG. 23 shows an enlarged section H from FIG. 22.

The same adjusting pistons 15 in different rotational positions can be used for inlet and outlet openings of different widths (see FIGS. 22 and 24). The receiving housing for the adjusting pistons 15 is adapted to the respective corresponding width of the inlet opening 2 and outlet opening 3.

In order to supply pressure gas through the opening 48 of the diaphragm seal 24 for different rotational positions of the adjusting pistons 15 and with those of the diaphragm seals 24, 25 arranged at the latter, this opening 48 is shaped as an elongated hole extending along a circular arc.

This opening is preferably closed by flexible plastics material for the diaphragm seal 24 as is shown in FIGS. 29 and 31.

The diaphragm seals 24, 25 are again formed of flexible plastic in the annular portion 34 and are rigidly constructed in a middle portion 30. For this purpose, a metal part 35 is embedded in the flexible plastics material in the middle portion or is at least partially surrounded by it as can be seen from FIGS. 30 and 31. The flexible plastics material extends along the side of the metal part 35 facing the inner surface of the wall 17 or valve plate 9 and preferably also along the opposite surface of the metal part 35 in a radial outer portion of the metal part 35.

FIG. 27 shows guides 49 for the adjusting pistons 15 which are arranged in the area of the circumferential edge of a respective adjusting piston 15.

FIGS. 32 and 33 show another embodiment example of the diaphragm seal 24. In the middle portion, the diaphragm seal is constructed in the manner described above with reference to FIGS. 30 and 31. In this embodiment form, the annular portion 34 is constructed in the manner of a rolling diaphragm and it carries out a kind of rolling movement when the adjusting piston 15 is displaced, i.e., the area of the portion 34 which is arc-shaped in cross section is displaced along this portion 34.

The diaphragm seal 25 can be constructed in an analogous manner, and the opening 48 can be closed (corresponding to FIG. 31).

Rolling diaphragms of the kind mentioned above can be used in all of the described embodiment forms for the diaphragm seal 24 and/or for the diaphragm seal 25.

Various modifications of the embodiment examples shown herein are conceivable and possible without departing from the scope of the invention. For example, a plurality of pins 31 could be provided. Also, more or fewer tappets 18 can be provided. Also, a plate-shaped contact pressing element could be arranged at the ends of the tappets 18 remote of the adjusting piston 15 for contacting the inner surface of the wall 5 of the valve housing 1. In this case, the tappets 18 are supported by the plate-shaped contact pressing element indirectly at the valve housing 1 in the area next to the outlet opening 3. In this case, only one individual, preferably centrally arranged, tappet 18 could also be provided.

Further, the valve plate could also be arranged at the end of the at least one tappet 18 remote of the adjusting piston 15 and can be pressed against the valve seat 6 by the adjusting piston 15. In this case, the wall of the receiving housing for the at least one adjusting piston 15 which is located opposite from the wall 17 that is penetrated by the at least one tappet 18 would contact the inner surface of the wall 5 of the valve housing 1 having the outlet opening 3 in the active position of the at least one adjusting piston 15 in the area around the outlet opening 3 and would transmit the reaction force to the valve housing 1.

As follows from the preceding description, the range of the invention is not limited to the embodiment examples shown herein, but rather should be defined with reference to the appended claims together with their full range of possible equivalents.

While the preceding description and drawings show the invention, it is obvious to a person skilled in the art that various modifications can be carried out without departing from the spirit of and field of the invention.

REFERENCE NUMBERS 1 valve housing
2 inlet opening
3 outlet opening
4 wall
5 wall
6 valve seat
7 interior space
8 closure unit
9 valve plate
10 sealing ring
11 swiveling axis
12 arm
13 rotary drive
14 longitudinal axis
15 adjusting piston
16 interior space
17 wall
18 tappet
19 bellows
20 longitudinal center axis
21 shaft
22 work space
23 work space
24 diaphragm seal
25 diaphragm seal
26 annular groove
27 projection
28 holder
29 clamping ring
30 middle portion
31 pin
32 seal
33 sliding bush
34 annular portion
35 metal part
36 flexible plastic
37 pressure gas channel
38 pressure gas channel
39 channel
40 pipe
41 pipe
42 diaphragm seal
43 spring
44 sealing ring
45 valve rod
46 piston-cylinder unit
47 projecting portion
48 opening
49 guide
51 sealing ring
52 guide pin

What is claimed is:

1. A vacuum valve comprising:

a valve housing which has an inlet opening and an outlet opening penetrating opposite walls of the valve housing;

a valve seat surrounding the inlet opening;

a closure unit which is arranged in an interior space of the valve housing and which has a valve plate which is adjustable between an open position in which it releases the inlet opening, an intermediate position in which it covers the inlet opening but is lifted from the valve seat, and a closed position in which it covers the inlet opening and is pressed against the valve seat;

at least one adjusting piston which is arranged in an interior space of the closure unit and, for the purpose of adjusting the valve plate between its intermediate position and its closed position, being displaceable in direction of its longitudinal center axis between a passive position in which the valve plate is in its intermediate position and an active position in which the valve plate is in its closed position;

at least one work space of the closure unit that can be acted upon by pressure gas for displacing said at least one adjusting piston into its active position being bounded by a diaphragm seal;

at least one tappet being arranged at the adjusting piston on the side facing the outlet opening; and said at least one tappet being guided out of the interior space of the closure unit through an opening and being supported directly or indirectly at the valve housing in the area next to the outlet opening for pressing the valve plate against the valve seat when the adjusting piston is displaced from its passive position into its active position.

2. The vacuum valve according to claim 1, wherein a first work space of the closure unit, by whose impingement by pressure gas the adjusting piston is displaceable into its active position, and a second work space of the closure unit, by whose impingement by pressure gas the adjusting piston is displaceable into its passive position, are sealed, respectively, by a diaphragm seal.

3. The vacuum valve according to claim 1, wherein the valve plate forms a wall of a receiving housing of the closure unit, wherein the receiving housing has the internal space in which the at least one adjusting piston is arranged.

4. The vacuum valve according to claim 1, wherein at least two tappets are provided, which tappets are supported directly or indirectly at the valve housing in the area next to the outlet opening when the adjusting piston is displaced from its passive position and its active position.

5. The vacuum valve according to claim 4, wherein the at least one adjusting piston has a circumferential contour deviating from the circular shape considered in the direction of its longitudinal center axis, and a tappet is arranged in the area of two oppositely located projecting portions of the adjusting piston in which the latter has a greater radial extension than in the rest of the area of its circumference.

6. The vacuum valve according to claim 1, wherein the diaphragm seal is plate-shaped.

7. The vacuum valve according to claim 1, wherein the diaphragm seal is tightly connected in the area of its circumferential edge to the adjusting piston, and a work space which is sealed by the diaphragm seal is formed between the diaphragm seal and the adjusting piston.

8. The vacuum valve according to claim 1, wherein the diaphragm seal has a rigid middle portion and a flexible annular portion surrounding the middle portion.

9. The vacuum valve according to claim 8, wherein the middle portion of the diaphragm seal contacts an inner surface of a wall which defines the interior space in which the at least one adjusting piston is arranged.

10. The vacuum valve according to claim 8, wherein the rigid middle portion of the diaphragm seal is pressed against the inner surface of the wall by an end of at least one pin extending parallel to the longitudinal center axis of the adjusting piston, the pin penetrates an opening in the adjusting piston and is accordingly sealed relative to the adjusting piston, wherein the at least one pin is supported at the other end directly or indirectly at an opposite wall of the closure unit defining the interior space of the closure unit.

11. The vacuum valve according to claim 10, wherein the pin extends between the middle portions of two diaphragm seals which seal a work space, respectively, this pin pressing the two diaphragm seals against opposite inner surfaces of walls defining the interior space in which the at least one adjusting piston is arranged.

12. The vacuum valve according to claim 10, wherein the pin extends between the middle portion of the diaphragm seal bounding the work space for the displacement of the adjusting piston into its active position and the inner surface of the opposite wall which defines the interior space in which the at least one adjusting piston is arranged.

13. The vacuum valve according to claim 8, wherein the diaphragm seal is formed of a flexible plastics material in the area of the flexible annular portion.

14. The vacuum valve according to claim 8, wherein the diaphragm seal has a plate-shaped metal part in the area of the rigid middle portion, which metal part is at least partially coated with a flexible plastics material.

15. The vacuum valve according to claim 1, wherein the diaphragm seal is at least partially made of flexible plastic.

16. The vacuum valve according to claim 1, wherein the valve plate is rigid.

* * * * *